No. 796,592. PATENTED AUG. 8, 1905.
H. MATTHIESEN.
VINEYARD HOE.
APPLICATION FILED FEB. 7, 1905.
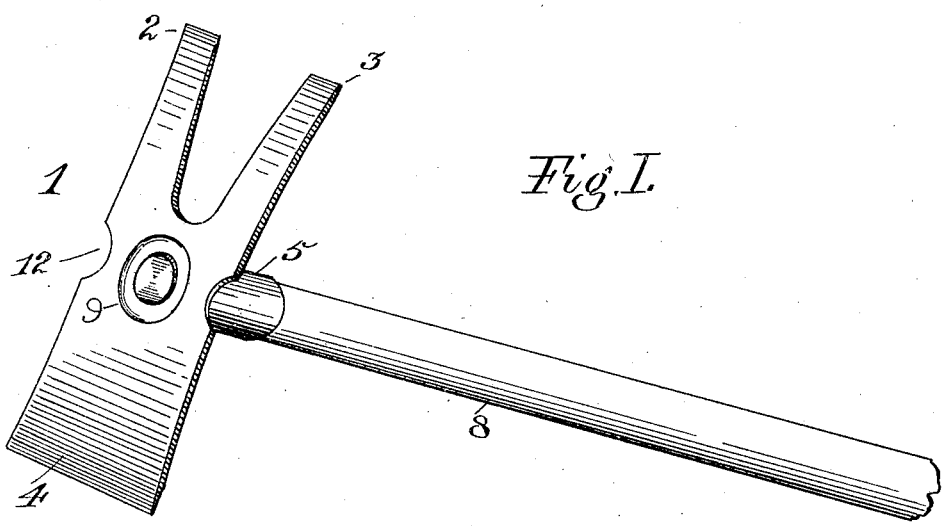
Fig. I.
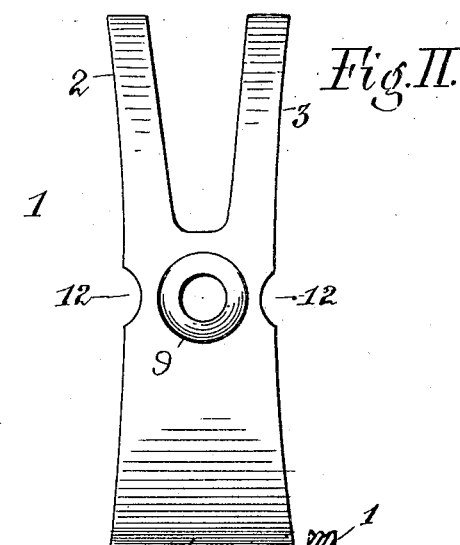
Fig. II.
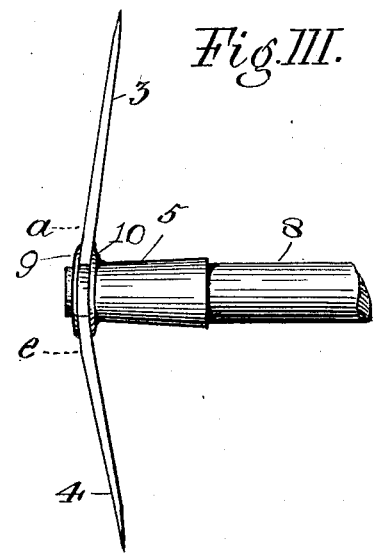
Fig. III.
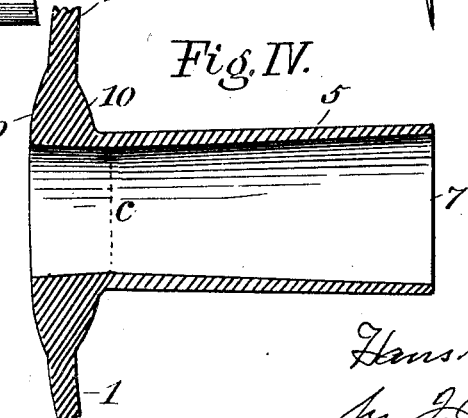
Fig. IV.
Witnesses:
F. Monteverde.
Elmer Wickes.
Inventor:
Hans Matthiesen,
by J. Richards & Co.
Attys.

UNITED STATES PATENT OFFICE.

HANS MATTHIESEN, OF LIVERMORE, CALIFORNIA.

VINEYARD-HOE.

No. 796,592.

Specification of Letters Patent.

Patented Aug. 8, 1905.

Application filed February 7, 1905. Serial No. 244,562.

*To all whom it may concern:*

Be it known that I, HANS MATTHIESEN, a citizen of the United States of America, residing at Livermore, county of Alameda, and State of California, have invented certain new and useful Improvements in Vineyard-Hoes; and I hereby declare the following to be a full, clear, and exact description of the same, reference being had to the accompanying drawings, forming a part of this specification.

This invention relates to certain useful improvements in hoes such as are employed to cultivate in vineyards, as hereinafter fully explained, and illustrated by drawings that form a part of this specification.

My improvements consist in the manner of constructing such hoes that reduces them to the least possible weight, by so disposing the material that each part will have the required strength without redundancy of weight, yet rendering the eye secure from breaking, and the handle-socket with a compound taper to prevent the handles from coming out in use.

The object of my invention is to produce a strong and specially-designed hoe of minimum weight of a form especially adapted for cultivating in vineyards, where the work has to be done by hand and is very laborious unless the implements employed are in every way adapted for this particular kind of work.

To attain the desirable features in hoes for vineyard cultivation, I construct them as shown in the drawings.

Figure I is a perspective view of a vineyard-hoe made with the socket and other parts according to my invention; Fig. II, a true front view of the same; Fig. III, an edge view of the same hoe; and Fig. IV, an enlarged section through the eye of the hoe, showing the construction of the handle-socket when the hoe is welded and complete.

The cultivation of vineyards is usually performed but once a year—in the spring season, before the earth becomes hard—and to avoid injury to the vines and secure careful treatment the work has to be done by hand with hoes. Such implements if too heavy or ill proportioned add greatly to the time and labor, and it is only by a careful study of all the circumstances that cultivating-hoes can be adapted for this work.

Referring to the drawings herewith, the general appearance of one of my improved vineyard-hoes, the main plate 1 is of fine steel, of nearly uniform thickness throughout, bifurcated at the top to form two tangs 2 and 3 of chisel form adapted for loosening and stirring the earth without moving it and to pass on each side of young vines and for use in hard earth when the main edge 4 will not penetrate. The main edge 4 is made sharp and slightly expanded at the end, as shown, both the main edge 4 and the tangs 2 and 3 having an approximately straight line from points at *a* and *e*. This requires less force to drive the hoe into the earth than if it were made on a true curve in the usual manner. The socket 5 is also made of steel to secure maximum strength with light weight and on the inside is tapered from the outer end 7 to the point *c* and from there to the front face is expanded or tapered the opposite way, as shown in Fig. IV. The purpose of this compound taper in the base of the socket is to provide for the insertion of wedges or other devices to prevent the handle 8 from coming out. The outer end of the handle being exposed to moisture and abrasion against the earth is soon expanded and firmly held.

The socket 5 is made of a thin section integral with a flange 9 at its end which is turned over and welded down on the face of the hoe, so as to become integral therewith.

The flange 10 is produced by putting a collar around the socket 5 after this is inserted in the main plate. The collar is then welded to the inner face of the plate with the flange 9, so the whole when complete is an integral structure, as shown in Fig. IV. This produces a careful and correct disposition of the material and the required strength at the principal fulcrum and part most exposed to fracture—the point where the socket joins the main plate at 12—and reduces the weight without impairing the strength.

It will be understood that the collars 9 and 10 can be attached to the main plate by processes other than welding—by brazing, for example—but not in so secure a manner as by welding.

Having thus explained the nature and objects of my invention and manner of constructing the same, what I claim as new, and desire to secure by Letters Patent, is—

1. In a vineyard-hoe, a main plate of uniform thickness bifurcated at the top, a socket and reinforcing-fillets integrally welded thereto on both sides of the main plate, substantially as specified.

2. In a vineyard-hoe, a main plate of uniform thickness, a double-filleted socket welded thereto, solid and bifurcated edges or tangs set in straight lines from the socket each way and at an angle with the handle, substantially as shown and specified.

3. In a vineyard-hoe, a main plate having solid and bifurcated edges or tangs, a handle-socket welded integrally with the main plate and made with converging and diverging tapers from the hoe-plate each way to permit the inner end of the hoe-handle to expand after it is inserted, substantially as specified.

In testimony whereof I have signed my name to this specification in the presence of two subscribing witnesses.

HANS MATTHIESEN.

Witnesses:
D. A. SMITH,
W. H. WRIGHT.